United States Patent [19]

Hird et al.

[11] Patent Number: 5,400,400
[45] Date of Patent: Mar. 21, 1995

[54] PAY TELEPHONE ARCHITECTURE

[75] Inventors: John A. Hird, Dallas; Todd J. Betz, The Colony, both of Tex.

[73] Assignee: Intellicall, Inc., Carollton, Tex.

[21] Appl. No.: 82,025

[22] Filed: Jun. 22, 1993

[51] Int. Cl.⁶ .......................................... H04M 1/00
[52] U.S. Cl. ................................... 379/453; 379/451
[58] Field of Search ............... 379/451, 437, 428, 453, 379/143, 153; 312/223.4; 52/27.5; 361/715, 725, 726, 727, 755, 756, 741, 802

[56] References Cited

U.S. PATENT DOCUMENTS

| | | | |
|---|---|---|---|
| 2,928,555 | 3/1960 | Childs et al. | 361/725 |
| 3,641,395 | 2/1972 | Nation | 361/725 |
| 4,972,296 | 11/1990 | Chu | 361/741 |
| 4,974,257 | 11/1990 | Ibanez et al. | 379/144 |
| 5,133,528 | 7/1992 | Vogl et al. | 379/437 |

FOREIGN PATENT DOCUMENTS 3-006896  1/1991  Japan .................................. 361/755

Primary Examiner—James L. Dwyer
Assistant Examiner—Jack Chiang
Attorney, Agent, or Firm—Baker & Botts

[57] ABSTRACT

A pay telephone (10) is disclosed which comprises a front housing assembly (12) and a rear housing assembly (14). A rear board housing (16) is coupled to modules disposed within front housing assembly (12) through a pair of cables (48) and (50) coupled to an interconnect board (46) disposed in front housing assembly (12). Front housing assembly (12) engages rear housing assembly (14) on opposite vertical sidewalls of rear housing assembly (14) through the use of locking hooks (36a)–(36e) and locking hooks (42a)–(42e) and locking receiving slots (40a)–(40e) and locking receiving slots (52a)–(52e).

8 Claims, 3 Drawing Sheets

PAY TELEPHONE ARCHITECTURE

TECHNICAL FIELD OF THE INVENTION

This invention relates in general to the field of electronic equipment and more particularly to an improved pay telephone.

BACKGROUND OF THE INVENTION

As pay telephone stations become more complex, more and more functionality and circuitry is included within the pay telephone housing. Because of this trend, pay telephone stations are increasingly more expensive and more difficult to maintain and install. For example, installation personnel are usually not skilled in complex electronic systems but rather are skilled in carpentry and the mechanical construction of the enclosure for the pay telephone station. As such, the installation personnel are more apt to unknowingly damage the complex electronics within the pay telephone housing. For example, pinched wires and inadvertently disconnected components are common problems resulting from improper installation of pay telephone stations.

In terms of reliability, pay telephones must survive the natural elements as well as prevent tampering with the internal electronics of the pay telephone by precluding unauthorized entry into the internal functionality of the station. As such, the pay telephone housing must be of rugged construction in order to survive both long-term exposure to the elements and continued use and to deter unauthorized activity.

Similarly, pay telephone stations must be constructed to allow for ease of service of the station. The same problems associated with the installation of the unit are also equally likely to occur during the servicing of the unit. In addition, as pay telephones become more and more complex, it is increasingly difficult to adapt a pay telephone unit in the field for new functionality. The various functions that a modern telephone station must support, such as coin calls, credit card calls, and complex graphical user prompts through liquid crystal displays or other sorts of displays make the task of adapting such machines after they have been installed in the field very difficult.

Accordingly, a need has arisen for a pay telephone architecture which allows for reliability, ease of installation and serviceability and ease of adaption through the addition of new functionality.

SUMMARY OF THE INVENTION

In accordance with the teachings of the present invention, a pay telephone architecture is described herein which substantially reduces or eliminates disadvantages associated with prior pay telephone systems.

According to one embodiment of the present invention, a pay telephone is disclosed which comprises a front panel assembly operable to hold a plurality of modules. Each of these modules is connected to an interconnect board. The interconnect board is then connected to a rear board assembly through a unitized cable that is resistant to damage. The rear board assembly is encased in a rear board housing. The front assembly and the rear board housing for the rear board assembly are both mounted on hinges so that when the pay telephone is opened for installation or service, the front assembly and rear board assembly can be pivoted out and away from the rear housing assembly.

In accordance with the teachings of another aspect of the present invention, the front housing assembly and rear housing assembly are joined by an interlocking mechanism disposed on opposite sidewalls of the front and rear assemblies. Accordingly, the interconnection of the front and rear assembly occurs along the entire length of both sidewalls of the assemblies, resulting in an extremely rugged and tamper-resistant closure of the front and rear housing assemblies.

In accordance with the teachings of another aspect of the present invention, the front housing assembly comprises modules which can be interchanged with replacement modules without affecting the structure or functionality of the rear board assembly. These modules may comprise, for example, card reader modules, keypad modules, or display modules.

BRIEF DESCRIPTION OF THE DRAWINGS

A more complete understanding of the advantages of the present invention may be acquired by referring to the accompanying drawings, in which like reference numbers indicate like features and wherein.

DETAILED DESCRIPTION OF THE INVENTION

Figure 1:
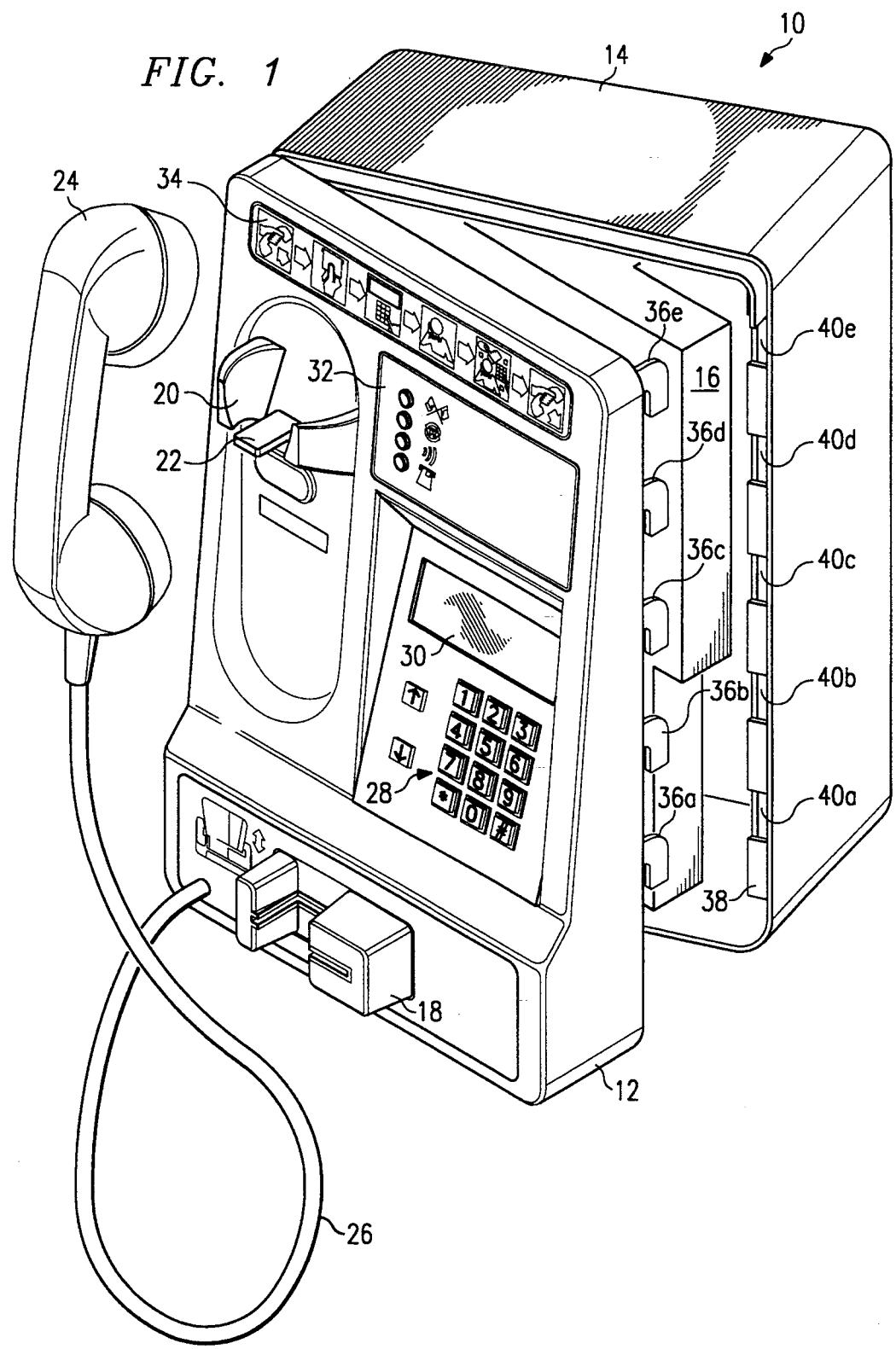
FIG. 1 is a perspective illustration of the pay telephone architecture of the present invention.

FIG. 1 is a schematic illustration of a pay telephone indicated generally at 10 which comprises a front housing assembly 12, a rear housing assembly 14, and a rear board housing 16.

Front housing assembly 12 serves as a mounting point for a variety of modules which are presented to a user of pay telephone 10. At the base of front housing assembly 12 is a card reader assembly 18. On the left side of front housing assembly 12, there is mounted a handset cradle 20 and a hookswitch 22, which are operable to receive a telephone handset 24, which is coupled both mechanically and electronically to front housing assembly 12 through a cable 26.

On the right side of front housing assembly 12, there is mounted a conventional twelve-key keypad 28. Disposed above keypad 28 is a liquid crystal display module 30. Above display module 30 is positioned a function key module 32 which is shown to comprise four function keys and an area where instruction labels for the operation of the four function keys can be placed.

Along the top edge of front housing assembly 12 is disposed a general label area 34 which may be used to display instructions for the general operation of the telephone 10.

Visible in FIG. 1 are locking hooks 36a-36e disposed on the edge of front housing assembly 12. Also visible in FIG. 1 is locking receiving plate 30a which comprises locking receiving slots 40a-40e.

As will be shown more completely in later figures, front housing assembly 12 is joined to rear housing assembly 14 through a multiple leaf and multiple pivot hinge which allows pay telephone 10 to be opened by first unlocking front housing assembly 12 from rear housing assembly 14, then sliding front housing assembly 12 upward relative to rear housing assembly 14, then translating front housing assembly 12 away from rear housing assembly 14 so that locking hooks 36a–36e disengage from locking receiving slots 40a–40e and similar locking hooks along the left edge of front housing assembly 12 and rear housing assembly 14 similarly disengage. Finally, front housing assembly 12 can be rotated away from rear housing assembly 14. In this manner, front housing assembly 12 is joined to rear housing assembly 14 along both the right and left vertical edges of the interface between assemblies 12 and 14. This allows for a very rugged and tamper-resistant joining assemblies 12 and 14. The hinged joinder allows for the convenience of the ability to rotate the front assembly 12 away from the rear housing assembly 14 during the service or installation of the components in either the front housing assembly 12 or the rear housing assembly 14. This rotation eliminates the need to completely remove the front housing assembly and to disconnect the interconnections between the front housing assembly 12 and the rear housing assembly 14 during service. Accordingly, the teachings of the present invention provide for both the convenience of a rotating front housing assembly and the durability and tamper-resistant nature of a locking mechanism which engages on both opposite vertical sidewalls of the combined assembly.

Figure 2:
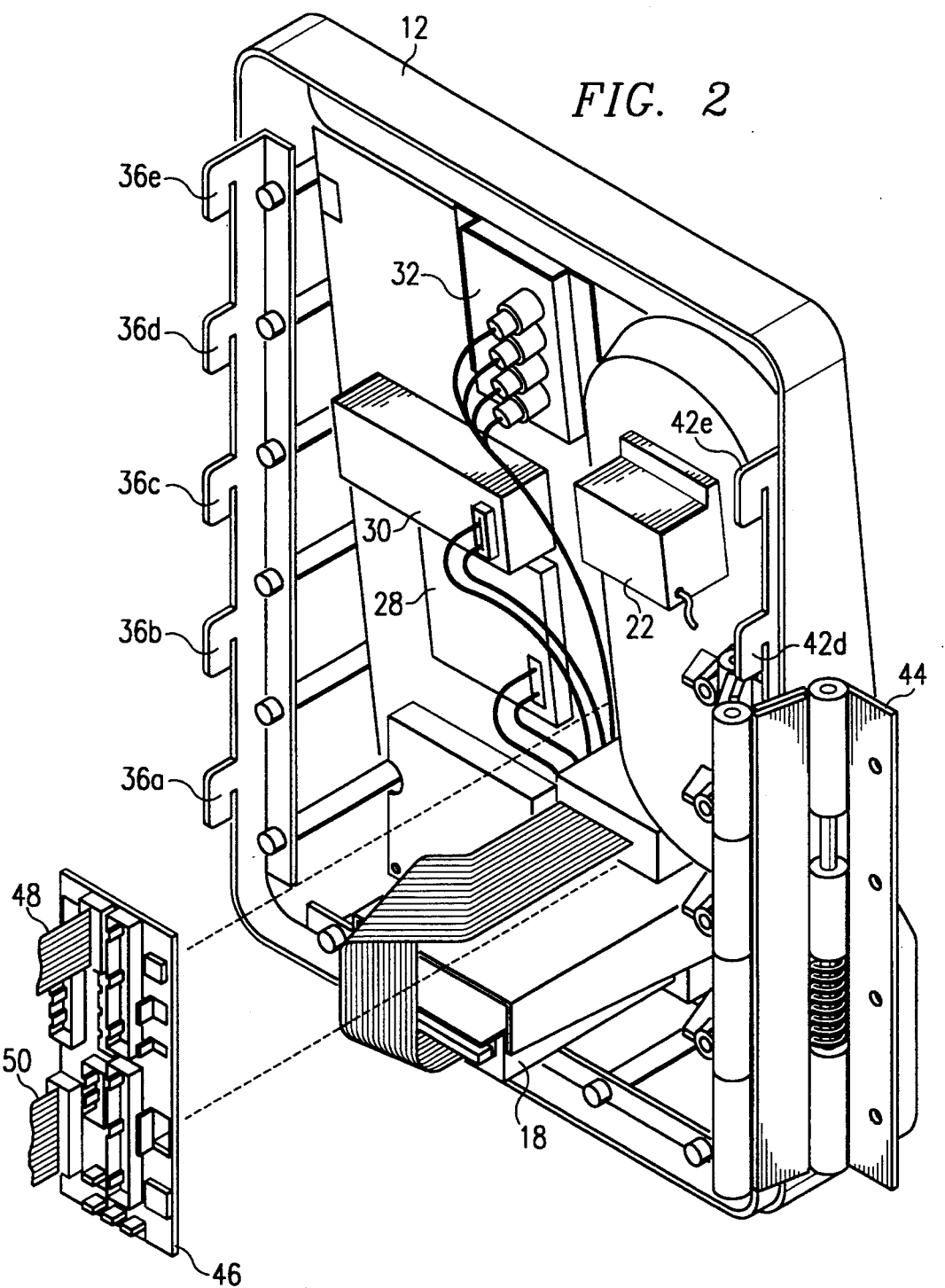
FIG. 2 is a perspective illustration of the front housing assembly used in accordance with the present invention.

FIG. 2 is a perspective diagram illustrating a rear view of front housing assembly 12. FIG. 2 represents a clearer view of locking hooks 36a–36e. In addition, locking hooks 42d and 42e are visible disposed on the left sidewall of front housing assembly 12. It should be understood that there also exists locking hooks 42a, 42b and 42c disposed along the left sidewall of front housing assembly 12 beneath locking hooks 42d and 42e and respectfully opposed from locking hooks 36a, 36b and 36c. Locking hooks 42a, 42b and 42c are hidden from view by a multi-leafed hinge 44 which is fixed to the left sidewall of front housing assembly 12. Hinge 44 is constructed to allow for the rotation of the front housing assembly 12 away from the rear housing assembly 14 discussed previously. In addition, hinge 44 is constructed to allow for both the vertical movement of front housing assembly 12 with respect to the rear housing assembly 14 and the lateral translation of both the right and left sidewalls of front housing assembly 12 away from the rear housing assembly 14 in order to allow the engagement or disengagement of the locking hooks 36a–36e and the locking hooks 42a–42e with the locking receiving slots, for example locking receiving slots 40a–40e formed in rear housing assembly 14.

FIG. 2 also supplies a rear view of hookswitch module 22, function key module 32, display module 30, keypad module 28 and cardreader module 18. Each of these modules is coupled to an interconnect board 46 which is mounted beneath hookswitch module 22 in front housing assembly 12. Interconnect board 46 serves as the termination point for a first forty-pin cable 48 and a second forty-pin cable 50. Cables 48 and 50 serve to connect the interconnect board 46 to the electronics contained within rear board housing 16 discussed previously. According to the teachings of the present invention, substantially all of the electronic interconnection between the systems within the front housing assembly 12 and the rear board housing 16 are routed from the modules within front housing assembly 12 to the interconnect board 46 and pass through the cables 48 and 50. Cables 48 and 50 are resistant to crimping, pinching and other accidental damage which might occur during installation or service of the pay telephone 10. In addition, the cables 48 and 50 are not susceptible to loosening as easily as individual wires might be.

An important technical advantage of the present invention inheres in the fact that different modules can be used in front housing assembly 12 without affecting the operation of the electronics in rear board housing 16 because of the use of the interconnection aboard 46. A different module can be used for card reader assembly 18 and much of the changes required by the different module can be accomplished on the interconnection board 46. Accordingly, by changing out the interconnection board 46 and the card reader assembly 18, a new card reader with different functionality can be installed in pay telephone 10 without changing any of the electronics in the rear board housing 16. All the required signal routing and signal conditioning can be accomplished in the cabling between assembly 18 and board 46 and on the interconnection board 46 itself.

Figure 3:
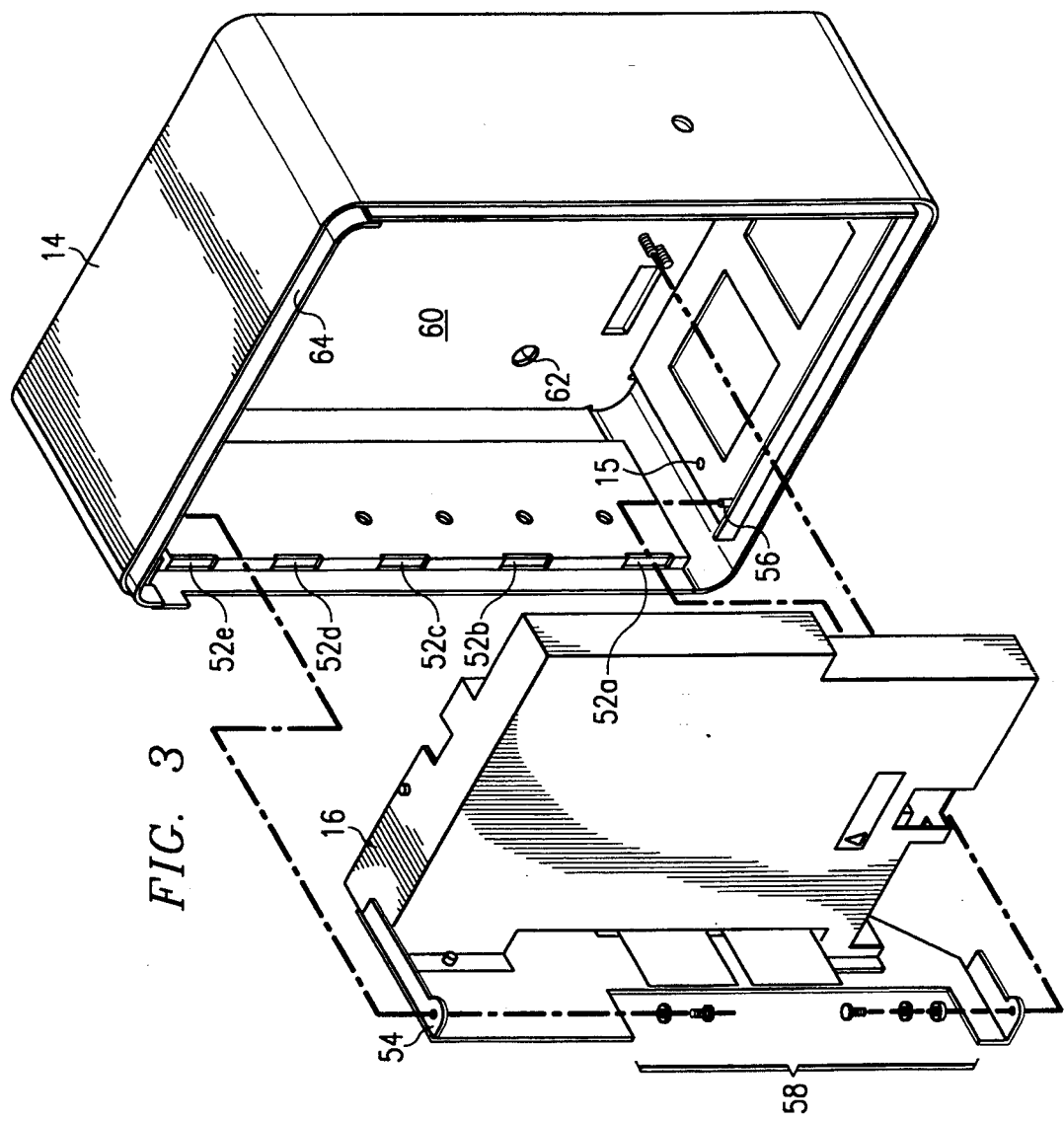
FIG. 3 is an elevational schematic illustration of the rear housing assembly used in accordance with the present invention.

FIG. 3 is an exploded perspective diagram that shows the construction and placement of rear board housing 16 within rear housing assembly 14. Also visible in FIG. 3 are locking receiving slots 52a, 52b, 52c, 52d and 52e which are operable to receive locking hooks 42a–42e discussed previously.

Rear board housing 16 is mounted on a hinge plate 54 which when assembled in a lower hingepin 56 and an upper hingepin (not shown) allow for the rotation of rear board housing 16 out of rear housing assembly 14. Suitable fasteners are provided to movably fix hingeplate 54 within rear housing assembly 14. Hingeplate 54 includes a notch 58 to allow for the mounting of hinge 44 coupling rear housing assembly 14 to front housing assembly 12 as discussed previously. Hingeplate 54 functions to offset rear board housing 16 into the rear of rear housing assembly 14 to allow for room for the modules mounted on the inner surface of front housing assembly 12. Also visible in FIG. 3 are the rear termination points of first forty-pin cable 48 and second forty-pin cable 50 which function to electrically connect the electronics within rear board housing 16 with the interconnect board 46.

Rear board housing 16 is essentially a durable metal box which contains the main circuit boards for the operation of pay telephone 10. The rear board housing 16 functions to protect the electronics within the housing 16 from inadvertent damage during the installation or servicing of the pay telephone 10. The rear board housing 16 rotates out of the way to allow an installer access to the rear wall 60 of rear housing assembly 14. An exemplary mounting hole 62 is shown in FIG. 3 disposed within rear wall 60. Accordingly, an installer of pay telephone 10 has access to the rear wall in order to mount the pay telephone in an appropriate location without ever having access to the electronics disposed within rear board housing 16. Once the installer has completed installation, the rear board housing 16 is rotated into its final position located with a detent 15, within the rear housing assembly 14 and the front housing assembly 12 can be rotated closed, shifted inward and then downward to lock it into position in front of rear housing assembly 14.

Rear housing assembly 14 also comprises an upper lip 64 which engages the inner surface of the top wall of front housing assembly 12 to form a weatherproof seal when front housing assembly 12 is fully locked into position adjacent rear housing assembly 14. The front housing assembly 12 and rear housing assembly 14 may comprise, for example, etched stainless steel to provide a durable, tamper-resistant and weatherproof finish.

Although the present invention has been described in detail, it should be understood that various changes, substitutions, and alterations may be made to the embodiment disclosed herein without departing from the spirit and scope of the present invention, which is solely defined by the appended claims.

What is claimed is:

1. A pay telephone comprising:
    a front housing assembly comprising a plurality of electronic modules;
    a rear housing assembly;
    a rear board housing containing electronics necessary for the operation of the pay telephone, said rear board housing rotatably mounted within said rear housing assembly;
    an interconnect board mounted in said front housing assembly and electrically connected to said plurality of circuit boards that are associated with the modules mounted in said front housing assembly; and
    a multiconductor cable coupled to said interconnect board and said electronics disposed within said rear board housing such that substantially all of the electronic communication between the modules mounted in said rear board housing pass through said interconnect board;
    means for coupling said rear housing assembly to said front housing assembly, so as to allow said front housing assembly to rotate and translate with respect to the rear housing assembly.

2. The pay telephone of claim 1 wherein said front housing assembly comprises front vertical opposing sidewalls and said rear housing assembly comprises opposing rear vertical sidewalls, the pay telephone further comprising:
    locking hooks disposed on both of said front vertical sidewalls; and
    locking receiving plates and fixed to each of said rear vertical sidewalls comprising locking receiving slots formed therein, said locking receiving slots operable to receive and engage with said locking hooks such that said front housing assembly is coupled to said rear housing assembly along opposing sidewalls.

3. The pay telephone of claim 2 and wherein said coupling means comprises a hinge mounted to said front housing assembly and said rear housing assembly and operable to allow vertical and horizontal translation of front housing assembly with respect to rear housing assembly and the rotation of front housing assembly away from the rear housing assembly in conjunction with said vertical and horizontal translation.

4. The pay telephone of claim 1 wherein said electronic modules comprise:
    a card reader assembly mounted in said front housing assembly and operable to receive cards from users of the pay telephone;
    a hookswitch module mounted in said front housing assembly and operable to detect the on-hook/off-hook condition of a handset associated with the pay telephone; and
    a keypad module mounted in said front housing assembly and operable to receive key strokes from users of the pay telephone.

5. The pay telephone of claim 3 and wherein said electronic modules further comprise:
    a display module mounted in said front housing assembly and operable to display information to users of the pay telephone; and
    a function key module mounted in said front housing assembly and operable to receive special function keystrokes from users of the pay telephone.

6. The pay telephone of claim 1 and further comprising a lip surface integral with said rear housing assembly and operable to form a weatherproof seal when said front housing assembly is engaged with said rear housing assembly.

7. A pay telephone comprising:
    a front housing assembly having a plurality of electronic modules mounted therein;
    a rear housing assembly;
    a rear board housing containing main electronics necessary for the operation of the pay telephone, said rear board housing rotatably mounted within said rear housing assembly;
    an interconnect board mounted in said front housing assembly and electrically connected to said plurality of modules mounted in said front housing assembly; and
    a multiconductor cable coupled to said interconnect board and said main electronics disposed within said rear board housing such that all of the electronic communication between the modules mounted in said front housing assembly and said main electronics mounted within said rear board housing pass through said interconnect board;
    said front housing assembly comprising front vertical opposing sidewalls and said rear housing assembly comprising opposing rear vertical sidewalls;
    locking hooks disposed on both of said front vertical sidewalls;
    locking receiving plates comprising locking received slots formed therein and fixed to each of said rear vertical sidewalls, said locking receiving slots operable to receive and engage with said locking hooks such that said front housing assembly is coupled to said rear housing assembly along opposing sidewalls;
    a hinge mounted to said front housing assembly and said rear housing assembly and operable to allow the vertical and horizontal translation of said front housing assembly with respect to said rear housing assembly and the rotation of front housing assembly away from the rear housing assembly in conjunction with said vertical and horizontal translation.

8. The pay telephone of claim 7 wherein said electronic modules comprise:
    a card reader assembly mounted in said front housing assembly and operable to receive cards from users of the pay telephone;
    a hookswitch module mounted in said front housing assembly and operable to detect the on-hook/off-hook condition of a handset associated with the pay telephone; and
    a keypad module mounted in said front housing assembly and operable to receive key strokes from a user of the pay telephone;
    a display module mounted in said front housing assembly and operable to display information to users of the pay telephone; and
    a function key module mounted in said front housing assembly and operable to receive special function keystrokes from users of the pay telephone.

* * * * *